(12) United States Patent
Raichelgauz et al.

(10) Patent No.: US 8,868,619 B2
(45) Date of Patent: Oct. 21, 2014

(54) SYSTEM AND METHODS THEREOF FOR GENERATION OF SEARCHABLE STRUCTURES RESPECTIVE OF MULTIMEDIA DATA CONTENT

(75) Inventors: Igal Raichelgauz, Herzelia (IL); Karina Ordinaev, Haifa (IL); Yehoshua Y. Zeevi, Haifa (IL)

(73) Assignee: Cortica, Ltd., Ramat Gan (IL)

( * ) Notice: Subject to any disclaimer, the term of this patent is extended or adjusted under 35 U.S.C. 154(b) by 46 days.

(21) Appl. No.: 13/602,858

(22) Filed: Sep. 4, 2012

(65) Prior Publication Data
US 2012/0331011 A1 Dec. 27, 2012

Related U.S. Application Data (63) Continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No.

(Continued)

(30) Foreign Application Priority Data

| Oct. 26, 2005 | (IL) | 171577 |
| Jan. 29, 2006 | (IL) | 173409 |
| Aug. 21, 2007 | (IL) | 185414 |

(51) Int. Cl.
G06F 17/30 (2006.01)

(52) U.S. Cl.
CPC ..... *G06F 17/3002* (2013.01); *Y10S 707/99943* (2013.01); *Y10S 707/99948* (2013.01)
USPC .............. 707/803; 707/999.102; 707/999.107

(58) Field of Classification Search
None
See application file for complete search history.

(56) References Cited

U.S. PATENT DOCUMENTS

| 5,940,821 A | 8/1999 | Wical |
| 5,987,454 A | 11/1999 | Hobbs |

(Continued)

FOREIGN PATENT DOCUMENTS

| WO | 02/31764 | 4/2002 |
| WO | 2007/049282 | 5/2007 |

OTHER PUBLICATIONS

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

(Continued)

*Primary Examiner* — Anteneh Girma
(74) *Attorney, Agent, or Firm* — M&B IP Analysts, LLC (57) ABSTRACT

A method for creating a multimedia data search engine platform to allow fast search of multimedia content data elements (MMDEs). The method comprises collecting MMDEs from at least an external source storing MMDEs; generating a plurality of signatures for each of the collected MMDEs; generating signature reduced clusters (SRCs) for the collected MMDEs by clustering the plurality of signatures generated for each of the collected MMDEs; and generating concept structures from the generated SRCs, wherein the concept structures generated for different SRCs are utilized to compare between different MMDEs, thereby searching for an input MMDE that matches the collected MMDEs.

17 Claims, 6 Drawing Sheets

Related U.S. Application Data

12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009.

(56) References Cited

U.S. PATENT DOCUMENTS

| | | | |
|---|---|---|---|
| 6,038,560 | A | 3/2000 | Wical |
| 6,240,423 | B1 | 5/2001 | Hirata |
| 6,243,375 | B1 | 6/2001 | Speicher |
| 6,363,373 | B1 | 3/2002 | Steinkraus |
| 6,493,692 | B1 | 12/2002 | Kobayashi et al. |
| 6,493,705 | B1 | 12/2002 | Kobayashi et al. |
| 6,523,022 | B1 | 2/2003 | Hobbs |
| 6,526,400 | B1 | 2/2003 | Takata et al. |
| 6,560,597 | B1 | 5/2003 | Dhillon et al. |
| 6,601,060 | B1 | 7/2003 | Tomaru |
| 6,611,628 | B1 | 8/2003 | Sekiguchi et al. |
| 6,611,837 | B2 | 8/2003 | Schreiber |
| 6,675,159 | B1 | 1/2004 | Lin et al. |
| 6,728,706 | B2 | 4/2004 | Aggarwal et al. |
| 6,754,435 | B2 | 6/2004 | Kim |
| 6,819,797 | B1 | 11/2004 | Smith et al. |
| 6,836,776 | B2 | 12/2004 | Schreiber |
| 6,901,207 | B1 | 5/2005 | Watkins |
| 6,970,881 | B1 | 11/2005 | Mohan et al. |
| 6,978,264 | B2 | 12/2005 | Chandrasekar et al. |
| 7,013,051 | B2 | 3/2006 | Sekiguchi et al. |
| 7,124,149 | B2 | 10/2006 | Smith et al. |
| 7,260,564 | B1 | 8/2007 | Lynn et al. |
| 7,296,012 | B2 | 11/2007 | Ohashi |
| 7,302,117 | B2 | 11/2007 | Sekiguchi et al. |
| 7,313,805 | B1 | 12/2007 | Rosin et al. |
| 7,346,629 | B2 | 3/2008 | Kapur et al. |
| 7,392,238 | B1 | 6/2008 | Zhou et al. |
| 7,406,459 | B2 | 7/2008 | Chen et al. |
| 7,450,740 | B2 | 11/2008 | Shah et al. |
| 7,523,102 | B2 | 4/2009 | Bjarnestam et al. |
| 7,536,384 | B2 | 5/2009 | Venkataraman et al. |
| 7,542,969 | B1 | 6/2009 | Rappaport et al. |
| 7,548,910 | B1 | 6/2009 | Chu et al. |
| 7,555,477 | B2 | 6/2009 | Bayley et al. |
| 7,555,478 | B2 | 6/2009 | Bayley et al. |
| 7,562,076 | B2 | 7/2009 | Kapur |
| 7,574,436 | B2 | 8/2009 | Kapur et al. |
| 7,574,668 | B2 | 8/2009 | Nunez et al. |
| 2003/0041047 | A1 | 2/2003 | Chang et al. |
| 2004/0153426 | A1 | 8/2004 | Nugent |
| 2005/0177372 | A1 | 8/2005 | Wang et al. |
| 2006/0031216 | A1 | 2/2006 | Semple et al. |
| 2006/0236343 | A1 | 10/2006 | Chang |
| 2006/0253423 | A1 | 11/2006 | McLane et al. |
| 2007/0009159 | A1 | 1/2007 | Fan |
| 2007/0011151 | A1 | 1/2007 | Hagar et al. |
| 2007/0038608 | A1 | 2/2007 | Chen |
| 2007/0074147 | A1* | 3/2007 | Wold .......................... 717/100 |
| 2007/0130112 | A1 | 6/2007 | Lin |
| 2007/0130159 | A1 | 6/2007 | Gulli et al. |
| 2007/0174320 | A1 | 7/2007 | Chou |
| 2007/0244902 | A1 | 10/2007 | Seide et al. |
| 2007/0253594 | A1 | 11/2007 | Lu et al. |
| 2007/0268309 | A1 | 11/2007 | Tanigawa et al. |
| 2007/0282826 | A1 | 12/2007 | Hoeber et al. |
| 2007/0294295 | A1 | 12/2007 | Finkelstein et al. |
| 2008/0072256 | A1 | 3/2008 | Boicey et al. |
| 2008/0172615 | A1 | 7/2008 | Igelman et al. |
| 2008/0201299 | A1 | 8/2008 | Lehikoinen et al. |
| 2008/0313140 | A1* | 12/2008 | Pereira et al. .................. 707/2 |
| 2009/0037408 | A1 | 2/2009 | Rodgers |
| 2009/0089587 | A1 | 4/2009 | Brunk et al. |
| 2009/0245603 | A1* | 10/2009 | Koruga et al. ............... 382/128 |
| 2010/0318493 | A1* | 12/2010 | Wessling .................... 707/609 |

OTHER PUBLICATIONS

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Cernansky et al., "Feed-forward Echo State Networks"; Proceedings of International Joint Conference on Neural Networks, Montreal, Canada, Jul. 31-Aug. 4, 2005.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Freisleben et al., "Recognition of Fractal Images Using a Neural Network", Lecture Notes in Computer Science, 1993, vol. 6861, 1993, pp. 631-637.

Ware et al., "Locating and Identifying Components in a Robot's Workspace using a Hybrid Computer Architecture"; Proceedings of the 1995 IEEE International Symposium on Intelligent Control, Aug. 27-29, 1995, pp. 139-144.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Fathy et al., "A Parallel Design and Implementation for Backpropagation Neural Network Using NIMD Architecture", 8th Mediterranean Electrotechnical Corsfe rersce, 19'96. Melecon '96, Date of Conference: May 13-16, 1996, vol. 3, pp. 1472-1475.

Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.

IPO Examination Report under Section 18(3) for corresponding UK application No. GB1001219.3, dated Sep. 12, 2011.

Lin, C.; Chang, S.: "Generating Robust Digital Signature for Image/Video Authentication", Multimedia and Security Workshop at ACM Mutlimedia '98; Bristol, U.K., Sep. 1998; pp. 49-54.

Iwamoto, K.; Kasutani, E; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Maass, W. et al.: "Computational Models for Generic Cortical Microcircuits", Institute for Theoretical Computer Science, Technische Universitaet Graz, Graz, Austria, published Jun. 10, 2003.

International Search Report for the corresponding International Patent Application PCT/IL2006/001235; Date of Mailing: Nov. 2, 2008.

Raichelgauz, I. et al.: "Co-evolutionary Learning in Liquid Architectures", Lecture Notes in Computer Science, [Online] vol. 3512, Jun. 21, 2005, pp. 241-248, XP019010280 Springer Berlin / Heidelberg ISSN: 1611-3349 ISBN: 978-3-540-26208-4.

(56) References Cited

OTHER PUBLICATIONS

Jaeger, H.: "The "echo state" approach to analysing and training recurrent neural networks", GMD Report, No. 148, 2001, pp. 1-43, XP002466251. German National Research Center for Information Technology.

Verstraeten et al.: "Isolated word recognition with the Liquid State Machine: a case study", Information Processing Letters, Amsterdam, NL, vol. 95, No. 6, Sep. 30, 2005, pp. 521-528, XP005028093 ISSN: 0020-0190.

Zeevi, Y. et al.: "Natural Signal Classification by Neural Cliques and Phase-Locked Attractors", IEEE World Congress on Computational Intelligence, IJCNN2006, Vancouver, Canada, Jul. 2006, XP002466252.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

Morad, T.Y. et al.: "Performance, Power Efficiency and Scalability of Asymmetric Cluster Chip Multiprocessors", Computer Architecture Letters, vol. 4, Jul. 4, 2005, pp. 1-4, XP002466254.

Burgsteiner et al.: "Movement Prediction From Real-World Images Using a Liquid State Machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

International Search Authority: "Written Opinion of the International Searching Authority" (PCT Rule 43bis.1) including International Search Report for International Patent Application No. PCT/US2008/073852; Date of Mailing: Jan. 28, 2009.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; Date of Issuance: Jul. 28, 2009.

Foote, Jonathan et al., "Content-Based Retrieval of Music and Audio"; 1997, Institute of Systems Science, National University of Singapore, Singapore (Abstract).

\* cited by examiner

SYSTEM AND METHODS THEREOF FOR GENERATION OF SEARCHABLE STRUCTURES RESPECTIVE OF MULTIMEDIA DATA CONTENT

CROSS-REFERENCE TO RELATED APPLICATIONS

This application is a continuation of U.S. patent application Ser. No. 12/603,123, filed on Oct. 21, 2009, now issued as U.S. Pat. No. 8,266,185, and which is a continuation-in-part of:

(1) U.S. patent application Ser. No. 12/084,150 having a filing date of Apr. 7, 2009, now pending, which is the National Stage of International Application No. PCT/IL2006/001235, filed on Oct. 26, 2006, which claims foreign priority from Israeli Application No. 171577 filed on Oct. 26, 2005 and Israeli Application No. 173409 filed on 29 Jan. 2006;

(2) U.S. patent application Ser. No. 12/195,863, filed Aug. 21, 2008, now allowed, which claims priority under 35 USC 119 from Israeli Application No. 185414, filed on Aug. 21, 2007, and which is also a continuation-in-part of the above-referenced U.S. patent application Ser. No. 12/084,150;

(3) U.S. patent application Ser. No. 12/348,888, filed Jan. 5, 2009, now pending, which is a CIP of U.S. patent application Ser. No. 12/084,150, filed on Apr. 7, 2009 and U.S. patent application Ser. No. 12/195,863 filed on Aug. 21, 2008; and (4) U.S. patent application Ser. No. 12/538,495, filed Aug. 10, 2009, now allowed, which is a CIP of U.S. patent application Ser. No. 12/084,150 filed on Apr. 7, 2009, U.S. patent application Ser. No. 12/195,863, filed on Aug. 21, 2008; and U.S. patent application Ser. No. 12/348,888, filed Jan. 5, 2009.

All of the applications referenced above are herein incorporated by reference.

TECHNICAL FIELD

The invention generally relates to content-management and search engines and more particularly relates to the collection, clustering and creation of concept structures of multimedia data elements for the purpose of effective storage, management, knowledge database generation and search.

BACKGROUND

With the abundance of multimedia data made available through various means in general and the Internet and worldwide web (WWW) in particular, there is a need for effective ways of searching for multimedia data, and management of such multimedia data. Searching, organizing and management of multimedia data in general and video data in particular may be challenging at best due to the difficulty of representing and comparing the information embedded in the video content, and due to the scale of information that needs to be checked. Moreover, when it is necessary to find a content of a video by means of textual query, prior art cases revert to various metadata that textually describe the content of the multimedia data. However, such content may be abstract and complex by nature and not necessarily adequately defined by the existing and/or attached metadata.

The rapid increase in multimedia databases, accessible for example through the Internet, calls for the application of new methods of representation of information embedded in video content. Searching for multimedia in general and for video data in particular is challenging due to the huge amount of information that has to be first indexed, classified and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases the model of the car would be part of the metadata but in many cases it would not. Moreover, the car may be oriented at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently generated, heterogeneous processing cores, mapping in parallel data-segments onto a high-dimensional space and generating compact signatures for classes of interest.

Searching multimedia data has been a challenge of past years and has therefore received considerable attention. Early systems would take a multimedia data element in the form of, for example an image, compute various visual features from it and then search one or more indexes to return images with similar features. In addition values for these features and appropriate weights reflecting their relative importance could be also used. Searching and indexing techniques have improved over time to handle various types of multimedia inputs and handle them in an ever increasing effectiveness. However, since the exponential growth of the use of the Internet and the multimedia data available there, these prior art systems have become less effective in handling the multimedia data, due to the vast amounts of data already existing, as well as the speed at which new ones are added.

Searching has therefore become a significant challenge and even the addition of metadata to assist in the search has limited functionality. Firstly, metadata may be inaccurate or not fully descriptive of the multimedia data, and secondly, not every piece of multimedia data can be accurately enough described by a sequence of textual metadata. A query model for a search engine has some advantages, such as comparison and ranking of images based on objective visual features, rather than on subjective image annotations. However, the query model has its drawbacks as well. Certainly when no metadata is available and only the multimedia data needs to be used, the process requires significant effort. Those skilled in the art will appreciate that there is no known intuitive way of describing multimedia data. Therefore, a large gap may be found between a user's perception or conceptual understanding of the multimedia data and the way it is actually stored and manipulated by a search engine.

The current generation of web applications has become more and more effective at aggregating massive amounts of data of various multimedia content, such as, pictures, videos, clips, paintings and mash-ups, and is capable of slicing and dicing it in different ways, as well as searching it and displaying it in an organized fashion, by using, for example, concept networks. A concept may enable understanding of multimedia data from its related concept. However, current art is unable to add any real "intelligence" to the mix, i.e., no new knowledge is extracted Thorn the multimedia data that are aggregated by existing systems. Moreover, the existing systems tend to be non-scalable due to the vast amounts of data they have to handle. This, by definition, hinders the ability to provide high quality searching for multimedia content.

There is therefore a need in the art to overcome the deficiencies of the prior art solutions and provide the building element for a search engine for content-management of multimedia data that is intelligent, effective and scalable.

SUMMARY

Certain embodiments disclosed herein include a method for generating concept structures from signature reduced dusters (SRCs). The method comprises retrieving from a storage at least one SRC including a duster of signatures respective of a plurality of multimedia data elements (MMDEs); generating metadata for the duster of signatures included in the at least one retrieved SRC; associating the generated metadata with the at least one retrieved SRC; matching the at least one retrieved SRC with a plurality of previously generated SRCs stored in the storage, wherein each of the plurality of previously generated SRCs that matches the at least one retrieved SRC forms a concept structure, wherein the concept structure includes at least metadata associated with the SRC matching the at least one retrieved SRC.

Certain embodiments disclosed herein further include a method for creating a multimedia data search engine platform to allow fast search of multimedia content data elements (MMDEs). The method comprises collecting MMDEs from at least an external source storing MMDEs; generating a plurality of signatures for each of the collected MMDEs; generating signature reduced dusters (SRCs) for the collected MMDEs by clustering the plurality of signatures generated for each of the collected MMDEs; and generating concept structures from the generated SRCs, wherein the concept structures generated for different SRCs are utilized to compare between different MMDEs, thereby searching for an input MMDE that matches the collected MMDEs.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments of the invention include a large-scale web-platform for a multimedia deep-content-classification (DCC) system, capable of continuously creating a knowledge database for multimedia data. The DCC system initially receives a large number of multimedia data elements (MMDEs) to create a knowledge base that is condensed into concept structures that are efficient to store, retrieve and check for matches. As new MMDEs are collected they are efficiently added to the knowledge base and concept structures such that the resource requirement is generally sub-linear rather than linear or exponential. The DCC system extracts patterns from each MMDE and selects the important/salient patterns for the creation of signatures thereof. A process of inter-matching between the patterns followed by clustering, is followed by reduction of the number of signatures in a duster to a minimum that maintains matching and enables generalization to new MMDEs. Metadata respective of the MMDEs is collected forming together with the reduced dusters a concept structure.

Figure 1:
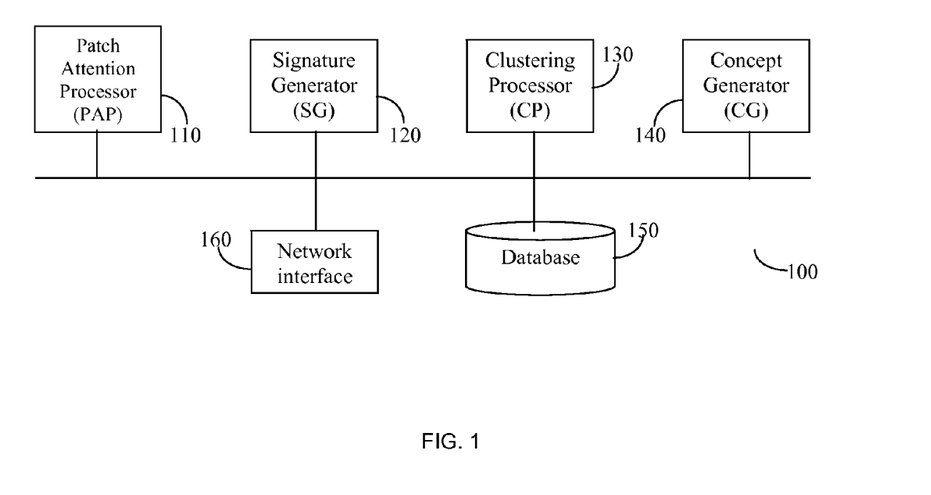
FIG. 1 is a diagram of a DCC system for creating concept structures in accordance with the invention.

FIG. 1 shows an exemplary and non-limiting diagram of a DCC system 100 for creating concept structures provided in accordance with the invention. The DCC system 100 is capable of receiving multimedia data elements (MMDEs), for example from the Internet via the network interface 160. The MMDEs include, but are not limited to, images, graphics, video streams, video clips, audio streams, audio clips, video frames, photographs, images of signals, combinations thereof, and portions thereof. The images of signals are images such as, but not limited to, medical signals, geophysical signals, subsonic signals, supersonic signals, electromagnetic signals, and infrared signals. In one embodiment of the invention the MMDEs are stored in a database (DB) 150. In another embodiment references to the MMDEs are kept in the DB 150 for future retrieval of the respective multimedia data elements. Such a reference may be, but is not limited to, a universal resource locator (URL).

Every MMDE in the DB 150, or referenced therefrom, is then processed by a patch attention processor (PAP) 110 resulting in a plurality of patches that are of specific interest, or otherwise of higher interest than other patches. In one embodiment of the invention a more general pattern extraction, such as an attention processor (AP) is used in lieu of patches. The AP receives the MMDE that is partitioned into items; an item may be an extracted pattern or a patch, or any other applicable partition depending on the type of the MMDE. The functions of the PAP 110 are described herein below in more detail. Those patches that are of higher interest are then used by a signature generator (SG) 120 to generate signatures respective of the patch. The operation of the signature generator is described in more detail herein below. A clustering process (CP) 130 initiates a process of inter-matching of the signatures once it determines that there are a number of patches that is above a predefined threshold. In one embodiment the threshold is defined to be large enough to enable proper and meaningful clustering. With a plurality of clusters a process of clustering reduction takes place so as to extract the most useful data about the cluster and keep it at an optimal size to produce meaningful results. The process of cluster reduction is continuous. When new signatures are provided after the initial phase of the operation of the CP 130, the new signatures may be immediately checked against the reduced clusters to save on the operation of the CP 130. A more detailed description of the operation of the CP 130 is provided herein below.

A concept generator (CG) 140 operates to create concept structures from the reduced clusters provided by the CP 130. Each concept structure comprises a plurality of metadata associated with the reduced clusters. The result is a compact representation of a concept that can now be easily compared against a MMDE to determine if the received MMDE matches a concept structure stored, for example in the DB 150, by the CG 140. This can be done, for example and without limitation, by providing a query to the DCC system 100 for finding a match between a concept structure and a MMDE. A more detailed description of the operation of the CG 140 is provided herein below.

It should be appreciated that the DCC system 100 can generate a number of concept structures significantly smaller than the number of MMDEs. For example, if one billion ($10^9$) MMDEs need to be checked for a match against another one billon MMDEs, typically the result is that no less than $10^9 \times 10^9 = 10^{18}$ matches have to take place, a daunting undertaking. The DCC system 100 would typically have around 10 million concept structures or less, and therefore at most only $2 \times 10^6 \times 10^9 = 2 \times 10^{15}$ comparisons need to take place, a mere 0.2% of the number of matches that had to be made by other solutions. As the number of concept structures grows significantly slower than the number of MMDEs, the advantages of the DCC system 100 would be apparent to one with ordinary skill in the art.

The operation of the PAP 110 will now be provided in greater detail with respect to an image of the MMDE. However, this should not be understood as to limit the scope of the invention; other types of MMDEs are specifically included herein and may be handled by the PAP 110.

Figure 2:
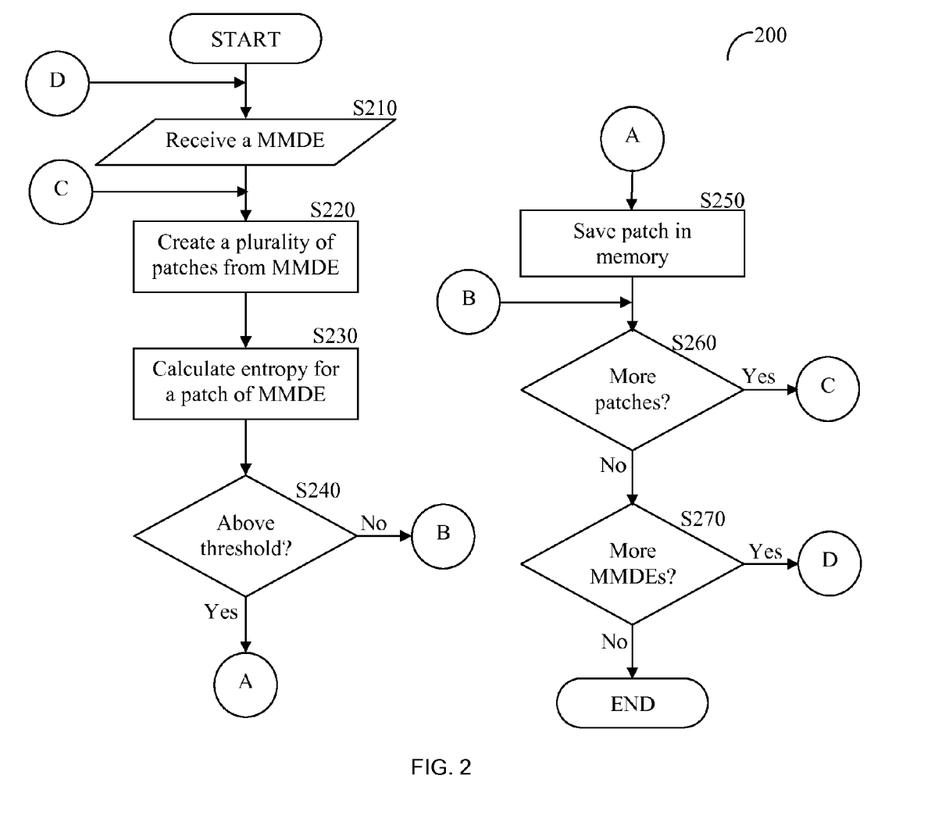
FIG. 2 is a flowchart illustrating the operation of the patch attention processor in accordance with an embodiment of the invention.

FIG. 2 depicts an exemplary and non-limiting flowchart 200 of the operation of the PAP 110. In S210 the PAP 110 receives a MMDE from a source for such MMDEs. Such source may be a system that feeds the DCC system 100 with MMDEs or other sources for MMDEs, for example the world-wide-web (WWW). In S220 the PAP 110 creates a plurality of patches from the MMDE. A patch of an image is defined by, for example, its size, scale, location and orientation. A patch may be, for example and without limitation, a portion of an image of a size 20 pixels by 20 pixels of an image that is 1,000 pixels by 500 pixels. In the case of audio, a patch may be a segment of audio 0.5 seconds in length from a 5 minute audio clip. In S230 a patch not previously checked is processed to determine its entropy. The entropy is a measure of the amount of interesting information that may be present in the patch. For example, a continuous color of the patch has little interest, whereas sharp edges, corners or borders, will result in higher entropy representing a lot of interesting information. In one embodiment a plurality of statistically independent cores, the operation of which is discussed in more detail herein below, is used to determine the level-of-interest of the image and a process of voting takes place to determine whether the patch is of interest or not.

In S240 it is checked whether the entropy was determined to be above a predefined threshold, and if so execution continues with S250; otherwise, execution continues with S260. In S250 the patch having entropy above the threshold is stored for future use by the SG 120 in, for example, DB 150. In S260 it is checked whether there are more patches of the MMDE to be checked, and if so execution continues with S220; otherwise execution continues with S270. In S270 it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than areas that are less meaningful for the formation of a concept structure.

Figure 3:
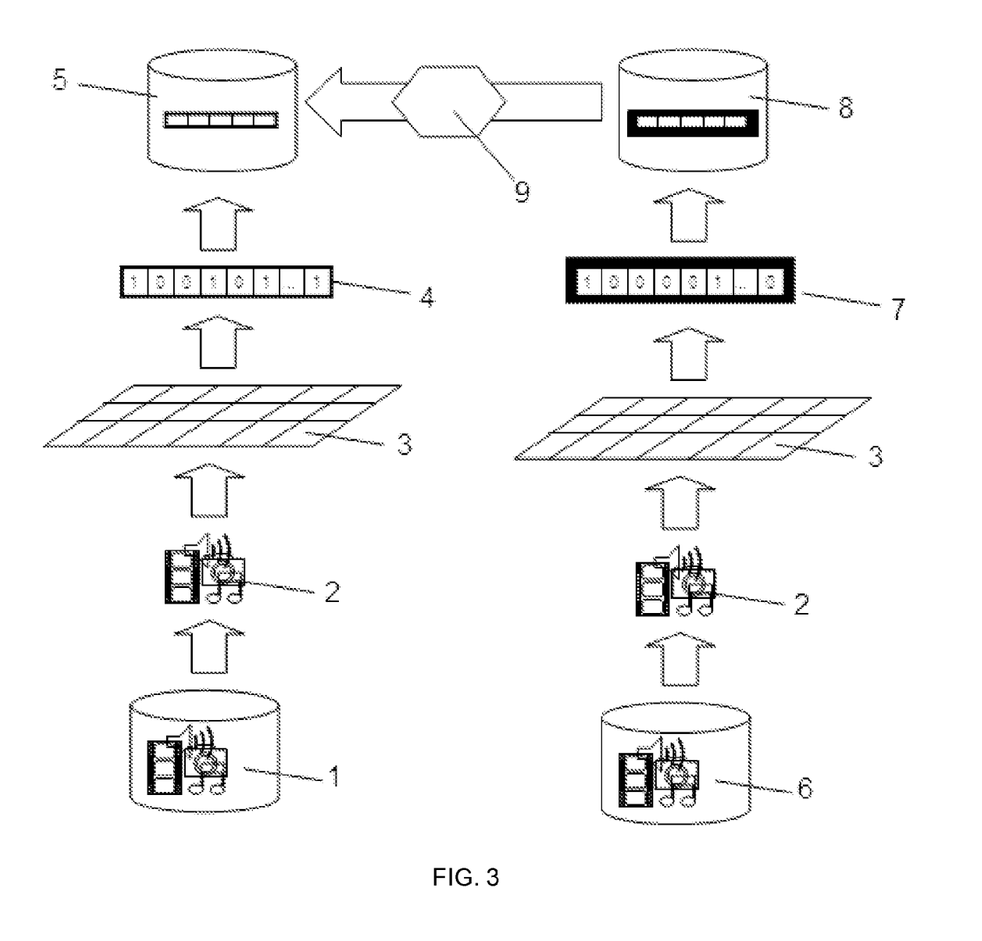
FIG. 3 is a block diagram depicting the basic flow of information in a large-scale video matching system.

A high-level description of the process for large scale video matching performed by the Matching System is depicted in FIG. 3. Video content segments 2 from a Master DB 6 and a Target DB 1 are processed in parallel by a large number of independent computational Cores 3 that constitute the Architecture. Further details on the computational Cores' generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or a Signatures database to find all matches between the two databases.

A brief description of the operation of the SG 120 is therefore provided, this time with respect to a MMDE which is a sound clip. However, this should not be understood as to limit the scope of the invention and other types of MMDEs are specifically included herein and may be handled by SG 120. To demonstrate an example of signature generation process, it is assumed, merely for the sake of simplicity and without limitation on the generality of the invention, that the signatures are based on a single frame, leading to certain simplification of the computational core's generation. The Matching System shown in FIG. 3 is extensible for signatures generation capturing the dynamics in-between the frames and the information of the frame's patches.

Figure 4:
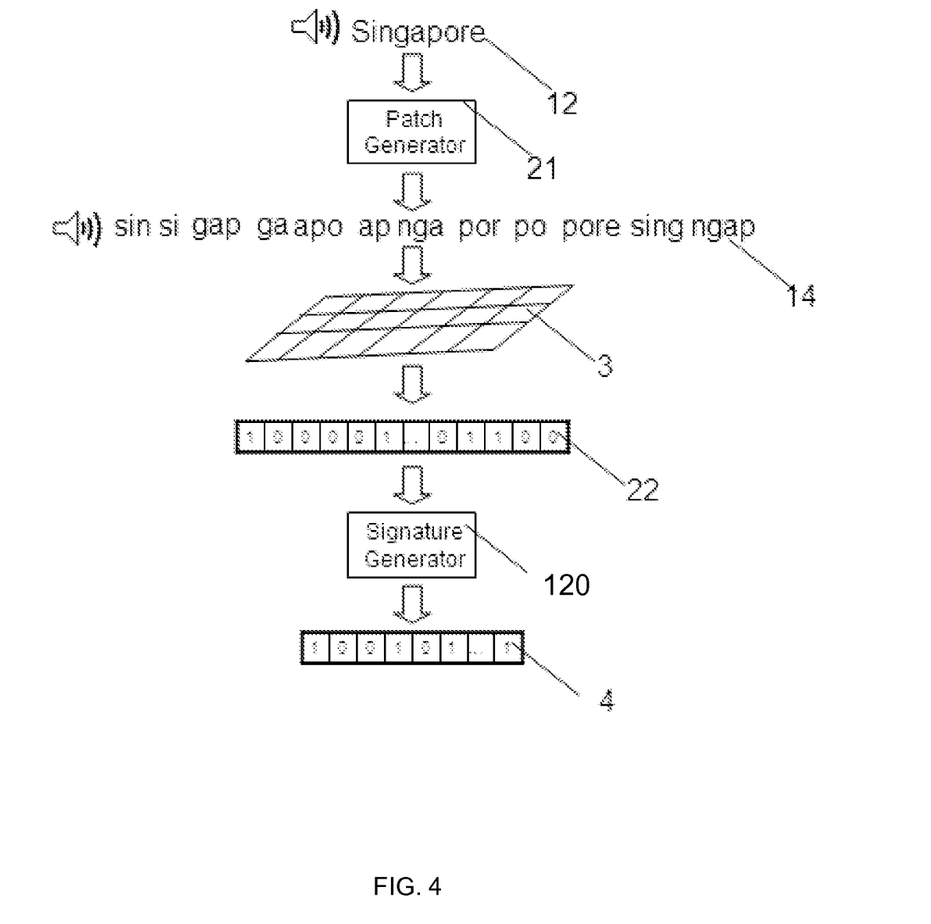
FIG. 4 is a diagram showing the flow of patches generation, response vector generation, and signature generation in a large-scale speech-to-text system.

The signatures generation process will be described with reference to FIG. 4. The first step in the process of signatures generation from a given speech-segment is to break-down the speech-segment to K patches 14 of random length P and random position within the speech segment 12. The break-down is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the Cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ ($1 \leq i \leq L$) may consist of a single leaky integrate-to-threshold unit (LTU) node or more nodes. The node n, equations are:

$$V_i = \sum_j w_{ij} k_j$$

$n_i = \theta(V_i - Th_x)$; $\theta$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:

For: $V_i > Th_{RS}$
$1 - p(V > Th_S) - 1 - (1-\epsilon)^l \ll 1$ i.e., given that/nodes (cores) constitute a Robust Signature of a certain image I, the probability that not all of these I nodes will belong to the Signature of same, but noisy image, $\tilde{I}$ is sufficiently low (according to a system's specified accuracy).

II: $p(V_i > Th_{RS}) \approx l/L$ i.e., approximately 1 out of the total L nodes can be found to generate Robust Signature according to the above definition.

III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison to the original data. Detailed description of the signature generation process can be found in the co-pending patent applications of which this patent application is a continuation-in-part of, and are hereby incorporated by reference.

Computational Core generation is a process of definition, selection and tuning of the Architecture parameters for a certain realization in a specific system and application. The process is based on several design considerations, such as: (a) The Cores should be designed so as to obtain maximal independence, i.e. the projection from a signal space should generate a maximal pair-wise distance between any two cores' projections into a high-dimensional space; (b) The Cores should be optimally designed for the type of signals, i.e. the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power, and, (c) The Cores should be optimally designed with regard to invariance to set of signal distortions, of interest in relevant applications.

Hence, in accordance with the principle of the invention, signatures are generated by the SG 120 responsive of patches received either from the PAP 110, or retrieved from the DB 150, in accordance with the principles shown hereinabove. It should be noted that other ways for generating signatures may also be used for the purpose the DCC system 100 and are explicitly considered part of the invention. Furthermore, as noted above, the array of cores may be used by the PAP 110 for the purpose of determining if a patch has an entropy level that is of interest for signature generation according to the principles of the invention. The generated signatures are stored, for example, in the DB 150, with reference to the MMDE and the patch for which it was generated thereby enabling back annotation as may be necessary.

Portions of the CP 130 have been discussed in detail in the co-pending U.S. patent application Ser. No. 12/507,489, entitled "Unsupervised Clustering of Multimedia Data Using a Large-Scale Matching System", filed Jul. 22, 2009, assigned to common assignee (the "'489 Application"), and which is hereby incorporated for all that it contains. In accordance with an embodiment an inter-match process and clustering thereof is utilized. The process can be performed on signatures provided by the SG 120. It should be noted though that this inter-matching and clustering process is merely an example for the operation of the CP 130 and other inter-matching and/or clustering processes may be used for the purpose of the invention.

Following is a brief description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. According to one embodiment of the invention, each cluster is represented by a small/compressed number of signatures, for example signatures generated by SG 12 as further explained hereinabove, which can be increased by variants. This results in a highly compressed representation of the content-universe. In one embodiment of the invention a connection graph between the multimedia data elements of a cluster may be stored. The graph can then be used to assist a user searching for data to move along the graph in the search of a desired multimedia data element.

In another embodiment, upon determination of a cluster, a signature for the whole cluster may be generated based on the signatures of the multimedia data elements that belong to the cluster. It should be appreciated that using a Bloom filter may be used to reach such signatures. Furthermore, as the signatures in accordance with the principles of the disclosed invention are correlated to some extent, the hash functions of the Bloom filter may be replaced by simpler pattern detectors, with the Bloom filter being the upper limit.

While signatures are used here as the basic data elements, it should be realized that other data elements may be clustered using the principles of the invention. For example, a system generating data items is used, where the data items generated may be clustered according to the disclosed principles. Such data items may be, without limitation, multimedia data elements. The clustering process may be performed by dedicated hardware or by using a computing device having storage to store the data items generated by the system and then performing the process described herein above. Then, the clusters can be stored in memory for use as may be deemed necessary.

The CP 130 further uses an engine designed to reduce the number of signatures used in a cluster, in a sense, extracting only the most meaningful signatures that identify the cluster uniquely. This can be done by testing a removal of a signature from a cluster and checking if the MMDEs associated with the cluster still are capable of being recognized by the cluster through signature matching. The process of signature extraction is on-going as the DCC system 100 operates. It should be noted that after initialization, upon signature generation by the SG 120 of a MMDE, its respective signature is first checked against the clusters to see if there is a match and if so it may not be necessary to add the signature to the cluster or clusters but rather simply associate the MMDE with the identified cluster or clusters. However, in some cases where additional refinement of the concept structure is possible, the signature may be added, or at times even replace one or more of the existing signatures in the reduced cluster. If no match is found then the process of inter-matching and clustering may take place.

Figure 5:
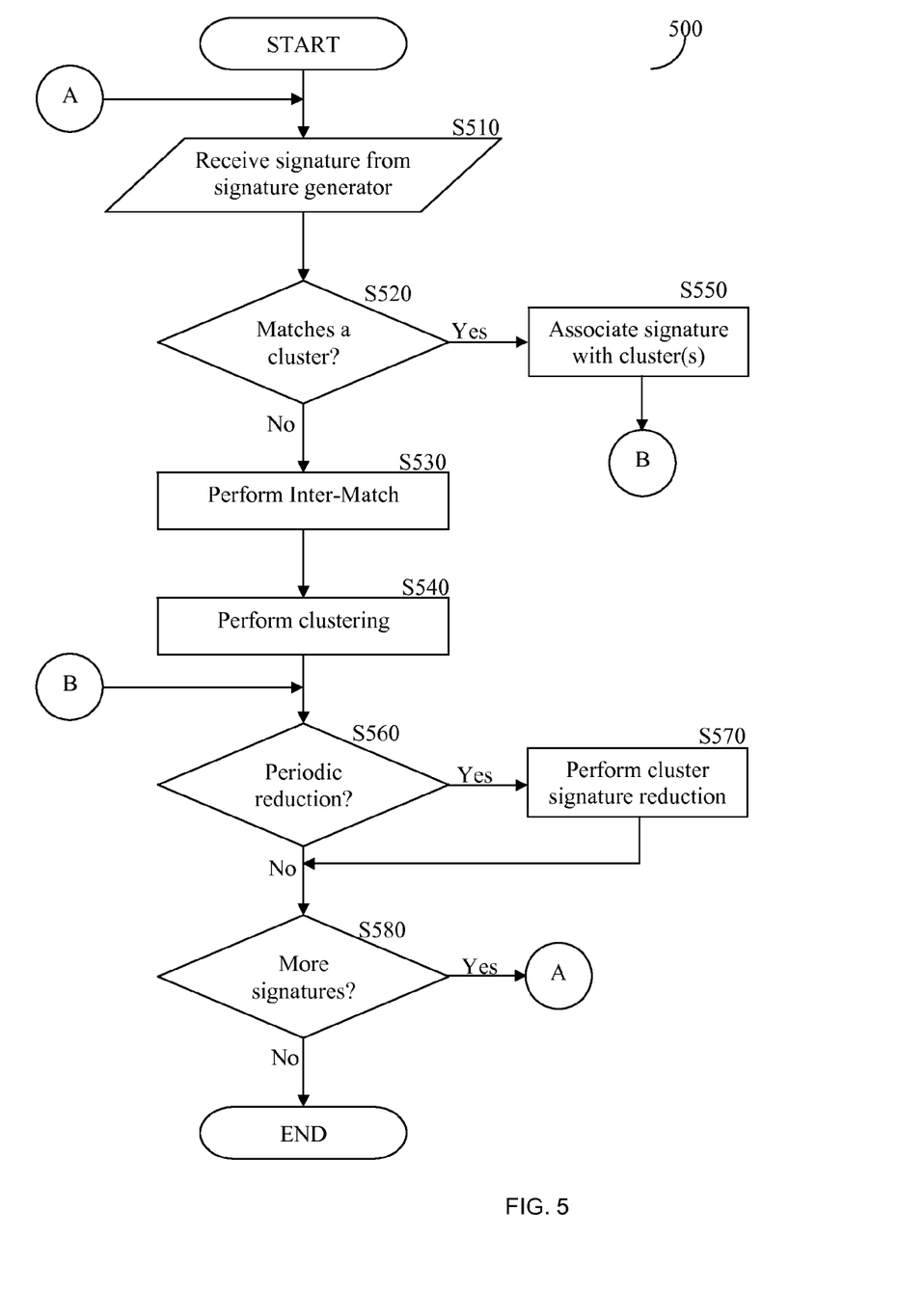
FIG. 5 is a flowchart illustrating the operation of the clustering processor in accordance with the principles of the invention.

FIG. 5 depicts an exemplary and non-limiting flowchart 500 of the operation of the CP 130. In S510 a signature of a MMDE is received, for example from the SG 120. In S520 it is checked whether the signature matches one or more existing clusters and if so execution continues with S550; otherwise, execution continues with S530. In S530 an inter-match between a plurality of signatures previously received by the DCC system 100 is performed, for example in accordance with the principles of the '489 Application. As may be necessary the DB 150 may be used to store results or intermediate results as the case may be, however, other memory elements may be used. In S540 a clustering process takes place, for example in accordance with the principles of the '489 Application. As may be necessary the DB 150 may be used to store results or intermediate results as the case may be, however, other memory elements may be used.

In S550 the signature identified to match one or more clusters is associated with the existing cluster(s). In S560 it is checked whether a periodic cluster reduction is to be performed, and if so execution continues with S570; otherwise, execution continues with S580. In S570 the cluster reduction process is performed. Specifically, the purpose of the operation is to ensure that in the cluster there remains the minimal number of signatures that still identify all of the MMDEs that are associated with the signature reduced cluster (SRC). This can be performed, for example, by attempting to match the signatures of each of the MMDEs associated with the SRC having one or more signatures removed there from. In one embodiment of the invention the process of cluster reduction for the purpose of generating SRCs is performed in parallel and independently of the process described herein above. In such a case after either S540 or S550 the operation of S580 takes place. In S580 it is checked whether there are additional signatures to be processed and if so execution continues with S510; otherwise, execution terminates. SRCs may be stored in memory, such as DB 150, for the purpose of being used by other elements comprising the DCC system 100.

The CG 140 performs two tasks, it associates metadata to the SRCs provided by the CP 130 and it associates between similar clusters based on commonality of metadata. Exemplary and non-limiting methods for associating metadata with MMDEs is described in U.S. patent application Ser. No. 12/348,888, entitled "Methods for Identifying Relevant Metadata for Multimedia Data of a Large-Scale Matching System", filed on Jan. 5, 2009, assigned to common assignee (the "'888 Application"), and which is hereby incorporated for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties found to be statistically independent of each other core, each generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with the at least second MMDE with the first MMDE.

Similar processes to match metadata with a MMDE or signatures thereof may be used in accordance with the invention, however, these should be viewed only as exemplary and non-limiting implementations, and other methods of operation may be used with respect to the DCC system 100 without departing from the scope of the invention. Accordingly, each SRC is associated with metadata which is the combination of the metadata associated with each of the signatures that are included in the respective SRC, preferably without repetition of metadata. A plurality of SRCs having metadata may now be associated to each other based on the metadata and/or partial match of signatures. For example, and without limitation, if the metadata of a first SRC and the metadata of a second SRC overlap more than a predetermined threshold level, for example 50% of the metadata match, they may be considered associated clusters that form a concept structure. Similarly, a second threshold level can be used to determine if there is an association between two SRCs where at least a number of signatures above the second threshold are identified as a match with another SRC. From a practical example one may want to consider the concept of Abraham Lincoln where images of the late President and features thereof, appear in a large variety of photographs, drawings, paintings, sculptures and more and are associated as a concept structure of the concept "Abraham Lincoln". Each concept structure may be then stored in memory, for example, in the DB 150 for further use.

Figure 6:
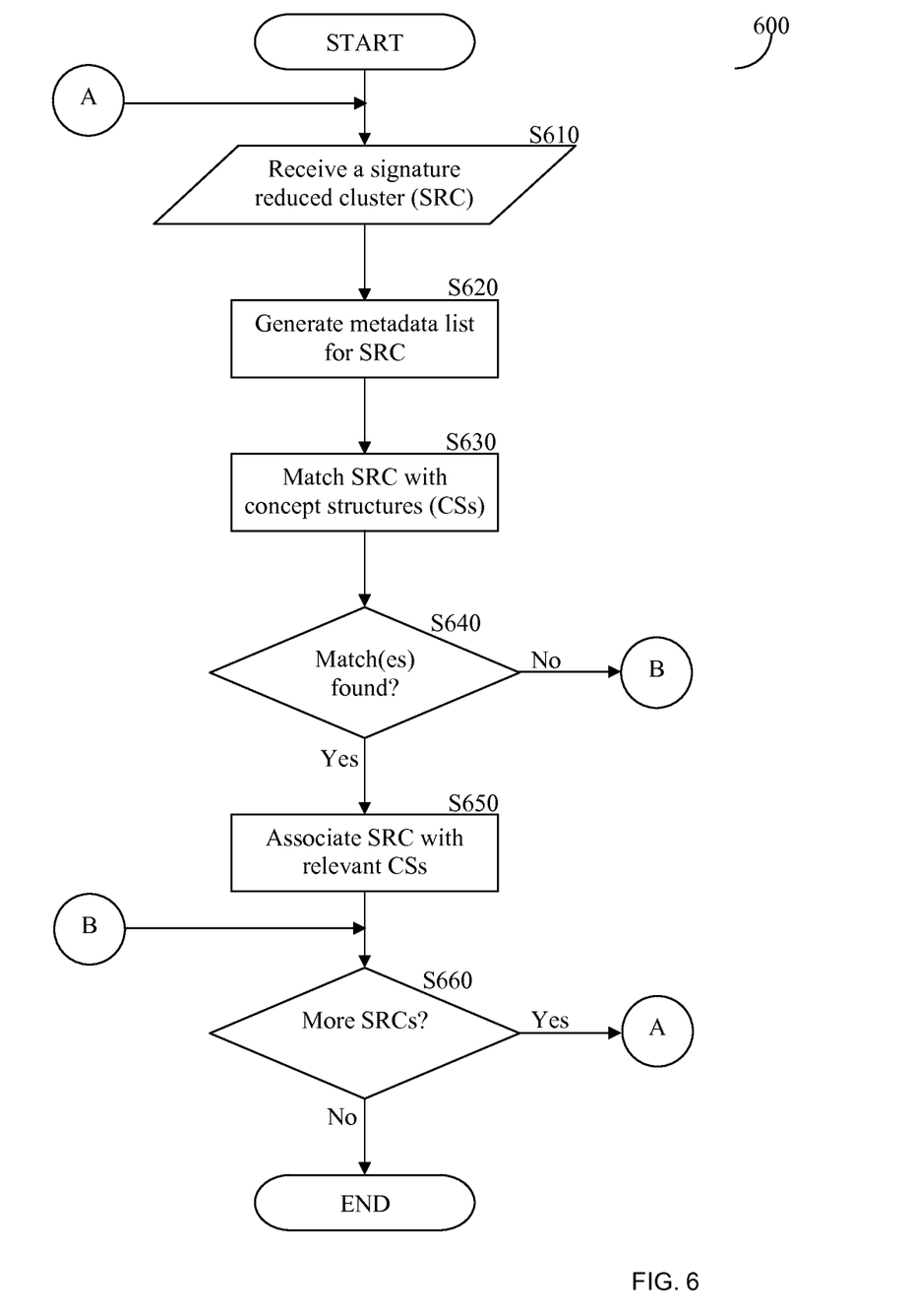
FIG. 6 is a flowchart illustrating the operation of the concept generator in accordance with the principles of the invention.

FIG. 6 shows an exemplary and non-limiting flowchart 600 of the operation of the CG 140 realized in accordance with the principles of the invention. In S610 the CG 140 receives a SRC from either the CP 130 or by accessing memory, for example, the DB 150. In S620 metadata are generated for the signatures of the SRC, for example in accordance with the principles described hereinabove. A list of the metadata is created for the SRC preferably with no metadata duplication. In one embodiment the commonality of metadata is used to signify the strength of the metadata with respect to a signature and/or the SRC, i.e., a higher number of metadata repetitions is of more importance to the SRC than a lower number of repetitions. Furthermore, in one embodiment a threshold may be used to remove those metadata that have a significantly low rate of repetition as not being representative of the SRC.

In S630 the SRC is matched to previously generated SRCs to attempt to find various matches, as described, for example, hereinabove in more detail. In S640, it is checked if at least one match was found and if so, execution continues with S650; otherwise, execution continues with S660. In S650 the SRC is associated with one or more of the concept structures to which the SRC has been shown to match. In S660 it is checked whether additional SRCs are to be received and if so execution continues with S610; otherwise, execution terminates.

A person skilled in the art would now appreciate the advantages of the DCC system 100 and methods thereof. The DCC system 100 is capable of creating automatically and in an unsupervised fashion concept structures of a wide variety of MMDEs. When checking a new MMDE it may be checked against the concept structures stored, for example, in the DB 150, and upon detection of a match providing the concept information about the MMDE. With the number of concept structures being significantly lower than the number of MMDEs the solution is cost effective and scalable for the purpose of identification of content of a MMDE.

The embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What we claim is:

1. A method for generating concept structures from signature reduced clusters (SRCs), comprising:
    retrieving from a storage at least one SRC including a cluster of signatures respective of a plurality of multimedia data elements (MMDEs);
    generating metadata for the cluster of signatures included in the at least one retrieved SRC;
    associating the generated metadata with the at least one retrieved SRC;
    reducing a number of signatures in the at least one retrieved SRC to include only signatures that uniquely identify the at least one retrieved SRC by temporarily removing a signature from the at least one retrieved SRC, checking if MMDEs associated with the at least one retrieved SRC can be recognized without the removed signature, and permanently removing the signature from the at least one retrieved SRC, if the MMDEs associated with the SRC can be recognized; and
    matching the at least one retrieved SRC with a plurality of previously generated SRCs stored in the storage, wherein each of the plurality of previously generated SRCs that matches the at least one retrieved SRC forms a concept structure, wherein the concept structure includes at least metadata associated with the SRC matching the at least one retrieved SRC.

2. The method of claim 1, wherein associating the generated metadata with the at least one retrieved SRC further comprising:
    associating the at least one retrieved SRC with a piece of metadata which is a combination of pieces of metadata with each of the signatures included in the at least one retrieved SRC.

3. The method of claim 2, wherein the combination of the pieces of metadata does not include repetition of metadata pieces.

4. The method of claim 2, wherein a match between the at least one retrieved SRC and a SRC from the plurality of previously generated SRCs is determined based on a first matching threshold, wherein the first matching threshold is defined by a percentage of overlap between the metadata associated with the at least one retrieved SRC and metadata associated with the SRC from the plurality of previously generated SRCs.

5. The method of claim 1, wherein a match between the at least one retrieved SRC and a SRC from the plurality of previously generated SRCs is determined based on a second matching threshold, wherein the second matching threshold is defined by a number of matches between signatures in the at least one retrieved SRC and signatures in the SRC from the plurality of previously generated SRCs.

6. The method of claim 1, wherein concept structures generated for different SRCs are utilized to compare between different MMDEs.

7. The method of claim 1, further comprising:
    storing in a storage unit at least one of the generated concept structures.

8. The method of claim 1, wherein the MMDEs include at least one of: an image, graphics, a video stream, a video clip, an audio stream, an audio clip, a video frame, a photograph, and images of signals.

9. The method of claim 8, wherein the images of signals include images of at least one of: medical signals, geophysical signals, subsonic signals, supersonic signals, electromagnetic signals, and infrared signals.

10. The method of claim 1, wherein the signatures are generated by a signature generator, wherein the signature generator comprises a plurality of computational cores, each computational core having properties statistically independent of each other of the computational cores, each computational core generates, responsive to a received MMDE at least a signature comprising a first signature element and a second signature element, the first signature element being a robust signature.

11. A non-transitory computer readable medium having stored thereon instructions for causing a processor to perform a method of claim 1.

12. A method for creating a multimedia data search engine platform to allow fast search of multimedia content data elements (MMDEs), comprising:
    collecting MMDEs from at least an external source storing MMDEs;

generating a plurality of signatures for each of the collected MMDEs;

generating signature reduced clusters (SRCs) for the collected MMDEs by clustering the plurality of signatures generated for each of the collected MMDEs, wherein clustering the plurality of signatures generated further includes: generating a clustering score for each signature of an MMDE of the collected MMDEs versus all other MMDEs of the collected MMDEs, determining a size of a diagonal matrix having a size corresponding to a number of the collected MMDEs, placing the clustering score in a diagonal matrix in storage, one clustering score for each pair of MMDEs, creating a new cluster element for each two cluster elements in the diagonal matrix having a clustering score that exceeds a threshold, and repeating the process at the newly created cluster element level each time using the new cluster elements generated as the plurality of cluster elements for the subsequent sequence, until a single cluster is reached or until it is determined that a single cluster cannot be reached; and generating concept structures from the generated SRCs, wherein the concept structures generated for different SRCs are utilized to compare between different MMDEs, thereby searching for an input MMDE that matches the collected MMDEs.

13. The method of claim 12, further comprising:

storing the generated concept structures, the collected MMDEs, the generated signatures, and the generated SRCs in a storage unit.

14. The method of claim 12, wherein the generating the concept structures from the SRCs, further comprising:

for each SRC performing:
    generating metadata for the cluster of signatures included in the SRC;
    associating the generated metadata with the SRC;
    matching the SRC with a plurality of stored SRCs, wherein each of the plurality of stored SRCs that matches the SRC forms a concept structure, wherein the concept structure includes at least metadata associated with each SRC that is found to be a match.

15. The method of claim 14, wherein generating the plurality of signatures for each of the collected MMDEs further comprising:

generating a plurality of items from each of the collected MMDEs;

determining which of the plurality of the items are of interest for signature generation; and generating at least a signature responsive to at least one item of interest.

16. The method of claim 14, wherein the signatures are generated by a signature generator, wherein the signature generator comprises a plurality of computational cores, each computational core having properties statistically independent of each other of the computational cores, each computational core generates, responsive to a received MMDE at least a signature comprising a first signature element and a second signature element, the first signature element being a robust signature.

17. A non-transitory computer readable medium having stored thereon instructions for causing a processor to perform a method of claim 12.

* * * * *